Oct. 13, 1931.    R. L. CARR    1,826,865
CONVERTIBLE BODY
Filed April 12, 1927    3 Sheets-Sheet 1

Inventor
R. L. Carr

Oct. 13, 1931.    R. L. CARR    1,826,865
CONVERTIBLE BODY
Filed April 12, 1927    3 Sheets-Sheet 2

Inventor
R L Carr

Patented Oct. 13, 1931

1,826,865

UNITED STATES PATENT OFFICE

RAYMOND L. CARR, OF BOSTON, MASSACHUSETTS

CONVERTIBLE BODY

Application filed April 12, 1927. Serial No. 183,199. REISSUED

This invention relates to a convertible vehicle body combining the advantages commonly associated with an open body with those which are characteristic of a closed body and also comprising various structural improvements which are especially applicable to a convertible body, although they may also be used advantageously in various other types of bodies. While my invention is particularly applicable to land vehicles, especially motor cars, certain features thereof may be advantageous in aircraft and small boats.

My copending application, Serial No. 91,209, filed February 27, 1926, discloses a similar type of body construction in which transparent closure panels are carried by the body wall, means being provided to permit these panels to be moved upwardly into juxtaposition so that they may form a substantially continuous transparent closure wall. The present invention is designed to afford a more satisfactory, simple and sturdy body of this character, which may be more economically manufactured. For this purpose, the panel holding and guiding means, as arranged in conjunction with the compact door post assembly, are adapted to permit the panels to be brought into proper juxtaposition even under abnormal conditions of body weaving or twisting; the panels being so held in juxtaposition that they compose a weathertight closure wall even when the body is abnormally strained. Such a continuous transparent closure wall may be formed when the vehicle top is lowered, while the panel mounting and valance construction cooperate to provide a weather-tight joint between the top and the upper ends of the panels when the top is raised. This construction provides the panels with considerable protection against breakage due to shocks or blows, while means may be provided especially to cushion or delay engagement of the panels with adjoining parts at the instant of door closing; and the panels themselves are so formed and shaped that they cooperate in preventing glass breakage and in providing a weather-tight closure wall.

The above and further objects and advantageous features of the invention will be apparent to those skilled in the art upon a reading of the subjoined description and claims in conjunction with the accompanying drawings, in which:

Referring to the accompanying drawings which exemplify the invention for purposes of illustration, it may be seen that closure panels 1 and 2 are carried by the front and rear doors $D^1$ and $D^2$ respectively. A third panel 3 is mounted upon the side of the body at the rear of the panel 2. Each of these panels may be formed of any suitable material, for example, glass, cellulosic compounds, or compositions of formaldehyde and urea such as described in Patent No. 1,507,624 to Pollak et al., but preferably the closure panels are formed of safety glass or laminated glass comprising outer laminæ of sheet or plate glass and an intermediate adhesive layer securing the glass laminæ to each other. The panels, if desired, may be framed to any suitable degree, but preferably the vertical margins of the panels are unframed so that they may be brought into juxtaposition to form a continuous, substantially transparent closure wall.

Figure 7:
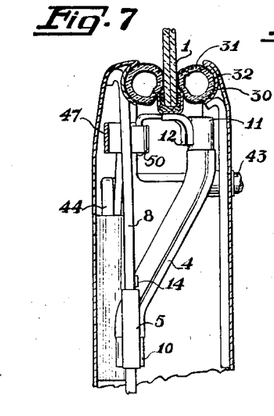
Fig. 7 is a section on line 7—7 of Fig. 1.

For this purpose I provide the front panel 1 with a lower frame member or holder 22 of channel section, which may be provided with cushioning or adhesive material 23 firmly to hold the panel in place. This material may be yieldable in order to permit relative movement between the panel and holder 22, but preferably, the yieldability of this material is somewhat restricted in order to limit relative movement of this character. Vertical guide members 8, which may be of resilient metal, are mounted within door $D^1$, and carry the vertically slidable collars 5. The latter have outstanding arms terminating in bearings 10 which receive resilient brackets 4 and define vertical axes about which the latter may swing. The upper end of each bracket 4 is pivotally connected to the panel holder 22 by the sleeve 11 and angle member 12, Fig. 7.

Figures 8, 9, 11:
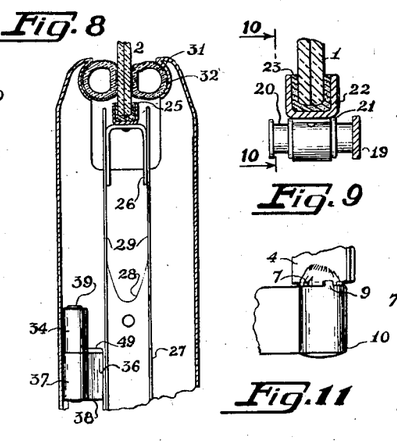
Fig. 8 is a section on line 8—8 of Fig. 4.
Fig. 9 is a section illustrating the connection between the closure panel and the closure lifter.
Fig. 11 is an elevational detail of a portion of the resilient bracket which supports the panel.
Figure 10:
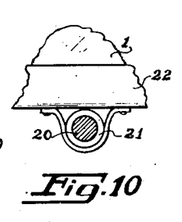
Fig. 10 is a section on line 10—10 of Fig. 9.

I provide suitable lifting mechanism 15 in order to raise and lower panel 1 and to move the same in a substantially longitudinal direction, thereby bringing it into juxtaposed or abutting relation to the adjoining panel 2. This lifting mechanism may be of conventional form consisting of a pair of sprockets 17 and 18 located adjoining the top and the lower part of the door, respectively. Wrapped about these sprockets is a chain 19 which carries an outstanding pin 20 that is received in a bushing 21 secured to the lower part of panel holder 22, Figs. 9 and 10, so that sliding of pin 20 through collar 21 will permit a limited transverse movement of the panel in relation to the lifting mechanism and so that the panel may pivot substantially in its own plane in relation to the chain. When the panel is lowered, as indicated in the full line showing of Fig. 1, pin 20 will be located upon the vertical run of the chain and when the panel is fully raised, pin 20 will be above sprocket 17, as shown by dot and dash lines; a longitudinal as well as a vertical movement thus being imparted to pin 20, panel holder 22, and panel 1; this results in lifting the panel from a position within the vehicle door $D^1$ to a position above and slightly overhanging the rear edge of this door. Openings 33 in the door walls permit this movement.

Figure 5:
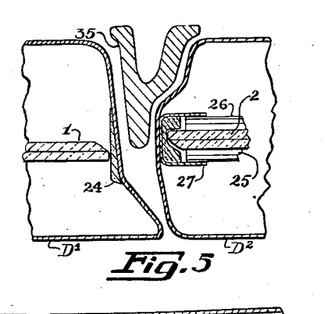
Fig. 5 is a section on line 5—5 of Fig. 1 showing the door post construction.

Preferably the guide means 8 are depended upon for defining the upward path of the panel under these conditions and the conventional channel guideways for the panel edges may therefore be dispensed with; I provide, however, suitable strips 24 of felt or the like which are secured to the front and rear walls of the door in order to form cushioning means for the panel edges, Fig. 5. During the upward and longitudinal movement of the panel, objectionable rocking of the same about pin 20 will be prevented by the guide members 8 and brackets 4 engaging the same. Preferably stops 14 project from the members 8 slightly above the normal top position of the collars 5 so that appreciable tilting of the panel is avoided. The closure panel 2 for the rear door, whether in raised or lowered position, normally acts as a stop to limit the rearward movement of panel 1, but stops 9 upon bearings 10 may engage nubs 7 upon brackets 4 to prevent panel 1 from moving too far, should the lifting mechanism be operated when one of the doors is opened, Fig. 11. Door $D^1$ is provided with an extension or rabbet 54 which normally is concealed behind the lower portion $S^1$ of windshield standard S and contains the front portion of panel 1 in its lowered position. The upper portion of the windshield standard is rearwardly inclined in order to provide the car with a more pleasing appearance and to afford better visibility to the driver.

In order to permit opening of the door when the panel is raised, I provide a rearwardly extending arm 55 which has a downwardly inclined stud 56 at its rear end, which engages a thimble 57 in the outer door rail. The lower portion of the windshield standard S is provided with a similar but shorter arm which carries an upstanding stud 59 engageable in a thimble 58 in the lower wall of the door. These studs and thimbles thus define an inclined pivot line that permits the inward movement of the extreme front portion of the door $D^1$ and the panel 1. The front edge of the panel 1 preferably is inclined substantially to correspond to the angle of inclination of the windshield standard, as shown, this portion of the panel being adapted to engage the cushion element 60 upon the inner surface of standard S, Fig. 13. Standard S may be of triangular cross section with the outer side thereof substantially aligned with the line of vision of a person in normal position in the front seat of the vehicle, and with the front margin of the inner side thereof, which carries cushion 60, defining the inner edge of the standard as viewed by the occupant of the vehicle, so that the standard affords the minimum of hindrance to visibility.

Panel 2 preferably is mounted in the rear door $D^2$ so that its movement is confined substantially to a vertical path, any suitable mechanism being provided for lifting this panel. Panel 2 is resiliently supported so that it may have a limited transverse or lateral movement, being mounted in a panel holder 25, end portions of which are secured to the inverted channel members or brackets 26, the legs of the latter being spaced at a distance somewhat greater than the width of member 25. The front and rear walls of door $D^2$ carry vertically disposed metal channels 27 of resilient material. Preferably the bight portion of each of these channels is cut away adjoining the upper part of the door, as designated by numeral 28, Fig. 8, so that the legs 29 of the channel extend upwardly along the upper part of the door wall to form resilient guide means for brackets 26. Since the metal extensions 29 are unsupported except at their lower ends, considerable transverse yieldability is afforded the panel in its raised position.

Preferably both doors $D^1$ and $D^2$, as well as the body wall adjoining the panel 3, are provided with rail portions having grooves 30 to receive cushioning elements 31. Elements 31 may conveniently be in the form of hollow tubes of rubber or the like, which may be covered with suitable material 32, such as felt, in order to provide means for wiping the panels each time they are raised or lowered, whereby the panel faces may be kept clean and transparent. Furthermore, elements 31 act as auxiliary supports for the panels to limit the transverse movement of their upper ends when they are lowered or partially lowered; it being understood that even in their lowest positions the panel upper ends are located between elements 31 which are slightly compressed thereby. The cushioning elements also retard or dampen any tendency of the panel supporting means to set up periodic vibrations which might otherwise result from repeated road shocks.

Figure 4:
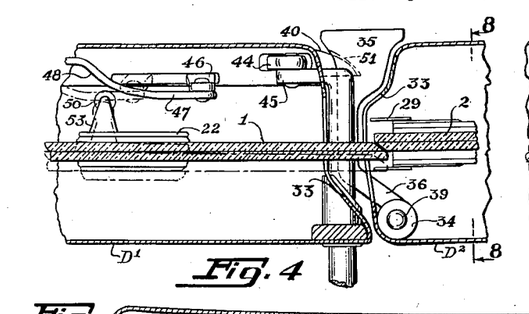
Fig. 4 is a section on line 4—4 of Fig. 1 showing the door post together with the door latch and hinge assemblies with the panels in their raised positions, the dot and dash lines indicating the closure panel position at the instant of door closing.

In order to permit the provision of a continuous closure wall with the minimum of panel movement and without the necessity of interposing posts or intermediate panels between the panels carried by the doors, I provide a compact door post assembly between doors $D^1$ and $D^2$. The door post 35 may preferably terminate considerably below the door rails in order to provide a suitable space for the latch shaft and for longitudinal movement of the lower rear corner of panel 1. Mounted upon the door post 35, and preferably integral therewith, is the hinge bracket 38 for the rear door. This hinge bracket is illustrated more particularly in Figs. 4 and 8 and comprises an outwardly and rearwardly inclined portion 36 which terminates in a knuckle 37 adjoining the outer front corner of door $D^2$. Member 36 preferably extends through a suitable slot 49 in the front wall of door $D^2$, Fig. 8. The hinge member 34 is secured to the door and is connected to the knuckle 37 by pintle 39. The thimble 41 in the bottom of door $D^2$ may engage an upstanding stud 42 to form the lower hinge for the rear door and to cooperate with the upper hinge in defining an axis entirely within door $D^2$ and in permitting the door $D^2$ to open in such a manner that the panels do not interfere with each other.

Preferably the inclined outer surface of member 36 may comprise a striker for engaging the latch 40 of door $D^1$ in order to cause retraction of the latch upon closing of the door. A suitable recess 51 in post 35 is adapted to receive this latch when the door is closed. Latch 40 is operable both by inner and outer handles. The shaft from the outer handle is designated by the numeral 43 and extends between adjoining walls of the doors $D^1$ and $D^2$ above door post 36, although obviously, if desired, the wall of door $D^1$ could be extended in order to enclose the shaft. The inner end of the shaft terminates in a crank 45 which engages a suitable slotted lever 44 within door $D^1$ to operate the latch mechanism. Since latch shaft 42 is located above hinge member 36 and between the panel edges when they are lowered, an exceedingly compact door post arrangement is afforded and the panel edges may be closely spaced when in their lowered positions.

The door latch may be provided with any suitable operating means upon the inner side of the door. For instance, the conventional remote door latch handle 52 may be used, a suitable upwardly extending lever 46 engaging a link 47 which connects with this handle 52 in the coventional manner. Preferably link 47 is provided with an offset cam-like portion 48 which is adapted to engage a roller 50 at the end of arm 53 that projects outward from panel holder 22 into the path of cam factor 48 when the panel is raised. Thus the operation of the latch mechanism upon shutting of the door flexes brackets 4 and members 8 outwardly and delays the engagement of the panel edges until the momentum resulting from the door movement has been substantially absorbed. While the latch mechanism is in normal position, members 48 and 50 are considerably spaced so that relative movement between the panel and the latch mechanism may occur without causing the follower 50 to contact with cam factor 48 when the door is closed. However, when the latch is operated the cam portion 48 engages roller 50, thus moving the panel outward, as indicated by the dotted line showing of Fig. 2 and as diagrammatically illustrated in the dot and dash showing of Fig. 4. Obviously any other suitable mechanism may be substituted for cam factor 48 and follower 50 in order to cushion or delay the panel upon the swinging door at the instant of door closing and thus to avoid danger of panel breakage.

Figures 14, 15, 16:
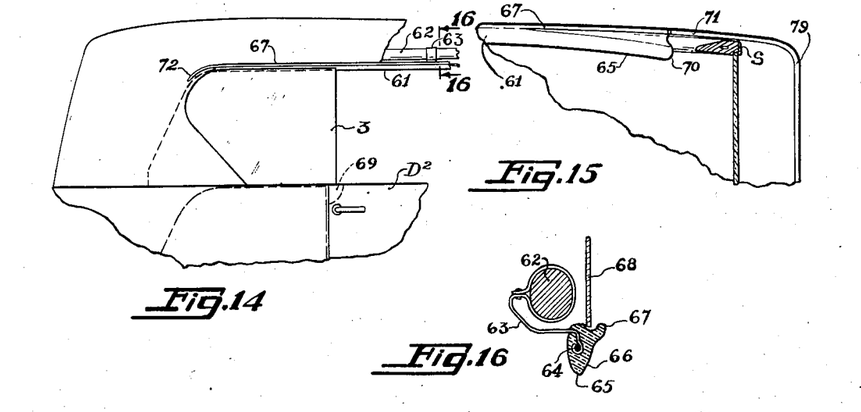
Fig. 14 is a side elevation of a portion of the vehicle body and top showing the mounting of the rear panel and the arrangement of the valance.
Fig. 15 is an inverted sectional view taken on line 15—15 of Fig. 1 and showing the valance construction adjoining the windshield standard.
Fig. 16 is an enlarged section on line 16—16 of Fig. 14 showing the resilient valance mounting.

The rear panel 3 preferably may be located in the rear portion of the body when in its lowered position, as designated by dash lines of Fig. 14, and may be raised and guided by mechanism similar to that disclosed for supporting and lifting panel 1, except that panel 3 is moved forwardly to engage the adjoining portion of panel 2 rather than rearwardly and its front edge is overlapped by the rear of panel 2. The rear edge of the panel 3 slopes downward and backward to afford greater stability and a more pleasing appearance to the closure wall, especially when the top is lowered. Preferably the door post portion adjoining the rear door $D^2$ is provided with an extension 69, Fig. 14, which fits in a broken away portion of the inner wall of door $D^2$ so that movement of panel 3 from its inoperative to its operative position does not interfere with opening of the door.

A suitable resilient valance 61 is carried by the top and is adapted to be engaged by the upper margins of the raised panels. Preferably this valance is secured to the framework or bows 62 of the top by any suitable supporting means 63 such as strips of resilient metal. These members may be located at intervals along the top and carry longitudinal reinforcements 64 which are embedded within the core of the valance but are suitably spaced from each other to permit flexing of the valance at points therebetween upon folding of the top. A valance of this character is more fully disclosed and claimed in my copending application Serial No. 371,162, filed June 15, 1929, while the arrangement of the gypsy curtain overlapping the rear portion of the rear closure panel as well as certain improved arrangements of the spring supporting means are also claimed in that application. An inverted ridge 65 upon the valance has a surface 66 inclined downwardly and inwardly so that it is adapted to engage the upper edges of the panels under all conditions of body movement or frame twisting and straining. Formed integrally with the outer portion of the valance member 61 is a gutter member 67 which is adapted to extend along the side of the top 68 and to catch water from the same, while preventing seepage of water between the valance and the upper edge of the raised panels. In order to permit inward movement of the front edge of panel 1 and yet to provide the gutter portion with an unbroken appearance, I provide the construction disclosed more particularly in Fig. 15, from which it will be seen that the main portion 65 of the valance curves inwardly to conform substantially to the position of panel 1, while the gutter portion 67 continues along the side of the top outside of the windshield standard and then along the front of the top, as designated by the numeral 79. In order to prevent a broken appearance which results from the termination of the main portion of valance member slightly to the rear of windshield standard S, as designated by numeral 70, I provide a downwardly extending rib 71 upon the front portion of the valance, the lower edge of this rib being substantially aligned with the lower edge of the main portion of the valance, Fig. 1. The rear portion of the gutter extends further back than the main body portion of the valance in order to form a downwardly inclined drain 72 at the back of the vehicle, as shown in Fig. 14.

The panels may be formed of various materials, as referred to above, but preferably are made of laminated glass, e. g., plate glass face panels adhesively secured to each other by a cellulosic or other transparent agglutinant. Preferably juxtaposed edges of the panels are beveled in order to permit more certain overlapping engagement of the same when they are brought into juxtaposition and in order to permit their continued over-lapping, weather-tight juxtaposition under conditions of body weaving and twisting.

Figure 12:
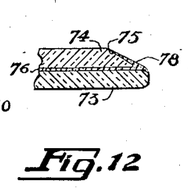
Fig. 12 is a sectional detail showing the panel edge construction.
Figure 21:
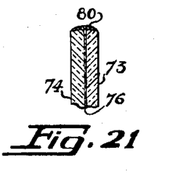
Fig. 21 is a sectional detail showing the construction of the upper margin of a closure panel.

Fig. 12 illustrates in detail one type of panel edge construction. Preferably one glass lamina 73 extends the full longitudinal extent of the panel while the other lamina 74 is beveled, as designated by numeral 75, in order to provide the panel with a beveled surface extending substantially half way across its edge. Preferably lamina 74 terminates slightly short of the outer edge of sheet 73. Laminæ 73 and 74 are adhesively secured to each other by a transparent agglutinant 76 which may be in the form of a cellulosic substance which is extended about the beveled surface 75 of sheet 74 in order to provide a cushion for the same, as designated by numeral 78. Preferably the outer surface of this cushion may be slightly curved. It is thus evident that a transparent panel is provided with a cushioning portion upon its marginal surface which is adapted to engage the adjoining panel to form a weather-tight joint therewith. The upper margin of the panel may be protected with a suitable cellulosic strip 80, Fig. 21, which is integral with the lamina 76. Preferably the panels are given a slight transverse curvature which not only affords them additional stiffness and strength but permits them substantially to conform to the curvature of the body side and thus enhances the appearance of the assembly.

Figure 22:
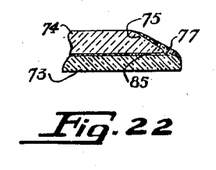
Fig. 22 illustrates an optional panel edge construction.

Fig. 22 shows a panel edge construction analogous to that illustrated in Fig. 12 with the exception that safety glass of the type employing a marginal seal or dam 85 is used in place of the continuous cellulosic layer. In this case the seal is preferably located slightly inward from the outer edge of sheet 73, and an outer V-shaped celluloid strip 77 is provided to straddle the beveled portion 75 of sheet 74, the inner edge of the inner leg of this V-shaped member being located close to the seal, as shown. Obviously, such a marginal piece would be adhesively secured to the glass by any suitable agglutinant or solvent.

The panel supporting means illustrated herein permits the panels in their raised position to be located in abutting engagement with one another and to remain in such engagement under conditions of body weaving, twisting, bending, or the like. The arrangement of the overlapping beveled edges of the glass permits relative movement between the panels due to body distortion without interfering with the weather-tight juxtaposition of the panels.

Figures 1, 2:
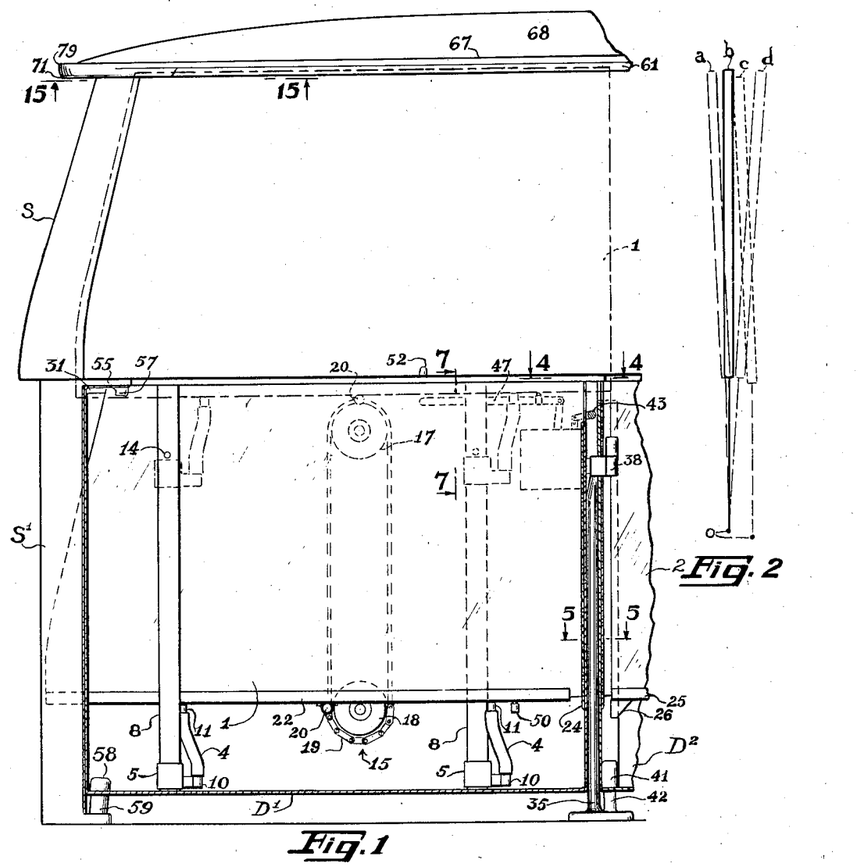
Fig. 1 is a side elevation of the front door and adjacent parts of the vehicle with the outer body wall and portions of the front, bottom and rear door walls removed, the raised position of the closure panel being indicated in dot and dash lines.
Fig. 2 is a diagrammatic view of various panel edge positions which may occur with a panel mounting such as disclosed in Fig. 1.
Figure 3:
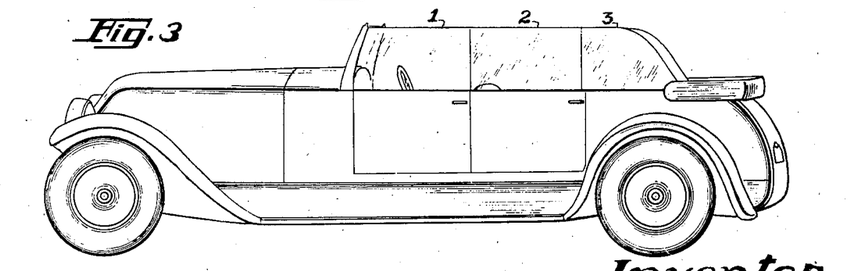
Fig. 3 is a perspective view of a motor car in which the invention is incorporated.

Fig. 2 diagrammatically illustrates the various positions of the edge of panel 1 in relation to the adjoining panel, angles of panel inclination being exaggerated for clarity of illustration. The dash line showing at the left of Fig. 2, designated $a$, indicates the normal position of the panel when the top is lowered and when panel 2 is lowered. Thus the shape of the resilient supporting elements and the position of the panel in panel holder 22 serve slightly to incline the panel so that its top edge is located inwardly in relation to the position which it normally occupies (indicated by the full lines of Fig. 2) when the panel 1 abuts panel 2 and the valance of the top. When panel 1 engages panel 2 or the valance of the vehicle top, it tends to occupy a position wherein the resilient members are somewhat flexed, whereby the panel margins are held firmly together, and considerable body weaving may occur before the margins can become separated. If the top is raised, panel 2 is lowered, and panel 1 is raised, panel 1 will tend to press the yieldable valance inward somewhat more than would be the case were the panel 2 also resisting this movement of the panel 1, so that the latter will occupy a position intermediate positions $a$ and $b$, diagrammatically illustrated in Fig. 2. Furthermore, when the top is raised the yieldable valance lies within the path of the panel upper edge and cushions the same before it abuts the adjoining panel; thus, in a vehicle with a permanently raised top, the panel delaying means operated by the latch mechanism may be dispensed with, if desired.

Figure 13:
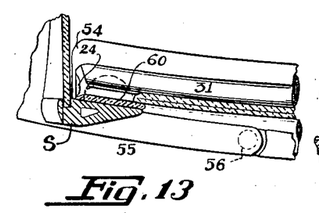
Fig. 13 is a broken view of the front door and panel assembly, parts being broken away and parts being shown in section in order to indicate the path of the panel.

When the panel follows its longitudinal path, the brackets 4 swivel about pivot elements 10 and thus guide the vertical edges of the panel along curved paths, it being evident that chain 19 engages sprocket 17 loosely enough to permit a slight swinging of pin 20 out of its normal position. Preferably rear guide member 8 is located adjoining the inner wall of the door and front member 8 is located adjoining the outer wall of the door so that the paths of the panel edges curve in different directions. Fig. 13 illustrates this movement of the panel and the corresponding bracket positions. It is thus evident that, when longitudinal movement of the panel occurs, the front edge thereof moves away from the cushion 60 upon the windshield standard while the rear edge of the panel moves outwardly, backwardly, and then inwardly, as designated by the dotted line at the right of Fig. 13, so that the beveled edge of panel 1 approaches the complimentarily beveled surface of panel 2 in a direction substantially normal to the planes of these surfaces. Thus even under extreme conditions of body distortion the panel 1 is carried into abutting engagement with panel 2. The position of the panel designated $c$ in Fig. 2 indicates the location of the panel edge in this portion of its path as it approaches the adjoining edge of panel 2. The position marked $d$ in the diagrammatic view of Fig. 2, shown in dot and dash lines, indicates the position of the panel when the latch is being operated or when for any reason the panel is being pushed outwardly.

When the resilient panel supporting elements are flexed, the panel swings about an approximate center which is located considerably below member 22, this supposititious center being designated by $o$ in Fig. 2. Thus, when the panel receives a lateral blow, it tends to swing about the center $o$ rather than about the base of the panel. Such an arrangement is particularly desirable when the lower portion of the panel is struck, since this portion has considerable freedom of movement rather than being retained in substantially fixed relation to the door, as would be the case were the resiliency of the cushioning means 23 solely depended upon for providing yieldability of movement for the panel.

When the latch mechanism is operated, as must necessarily occur when the door is shut, the link 48 engages the follower 50 to move the panel 1 outwardly so that it will not abut the panel 2 at the instant in which the door slams but so that the momentum with which panel 1 strikes panel 2 results only from the movement of the adjoining edge of panel 1 a fraction of an inch, the element 78 serving to cushion even this slight shock. Obviously the movement of panel 2 may be confined to a vertical path, but even in its lowered position the upper portion of this panel is engaged by the fully raised panels 1 and 3 so that the panels may always be guided into proper engagement to form a closure wall when they are fully raised. The resilient supporting means 26 and 29 for panel 2 permits a movement under lateral shocks and strains similar to that described in connection with panel 1, and it is evident that flexing of the supporting means for the front panel, due to its engagement with panel 2, will cause flexure in the opposing direction of the supporting means for the latter panel.

The cushioning means 31 are particularly advantageous in supporting the panels when the latter are partially raised and when the brackets supporting the holders therefor are considerably below the door top so that a moderate shock or blow upon the upper edge of the panel would tend to cause considerable movement of the panel portion between the door rails. This, however, is absorbed by cushion members 31 and positively limited by them so that in no case can the panel strike against the metal portion of the door. Provision of the covering 32 upon cushion elements 31 permits removal of dust or the like from the glass and dispenses with the necessity of polishing the glass as often as otherwise would be necessary.

Obviously means similar to those utilized to obtain and maintain a weather-tight joint between panels 1 and 2 and to protect these panels upon door closing may be utilized to perform similar advantageous functions for panels 2 and 3. Thus panel 3 may be provided with lifting and guiding mechanism similar to that of panel 1, such mechanism being arranged, however, to move the panel forwardly into a position wherein its edge may be overlapped by the rear edge of panel 2. The latch mechanism for the rear door may be arranged to cooperate with suitable means at the instant of door closing to delay the return of the rear edge of panel 2 to its normal abutting engagement with panel 3, although obviously in the case of the rear door, the factor corresponding to link 47 need not also form a connection for the inner door latch handle.

Thus the various relative positions of adjoining edges of panels 2 and 3 may correspond in general to those diagrammatically indicated for the edges of panels 1 and 2 in Fig. 2. For example, the supporting means for these panels are slightly flexed when they are brought into abutting engagement, while they both tend to press inwardly upon the inverted ridge 65 of the valance. The front edge of panel 3 follows a curved path which is inward, forward, and outward so that it approaches the complimentarily beveled surface of panel 2 in a direction substantially normal thereto, it being evident that the yieldability and the inclined surface 66 of valance 61 permit the upper edge of the panel to follow a path of this curvature.

Figure 6:
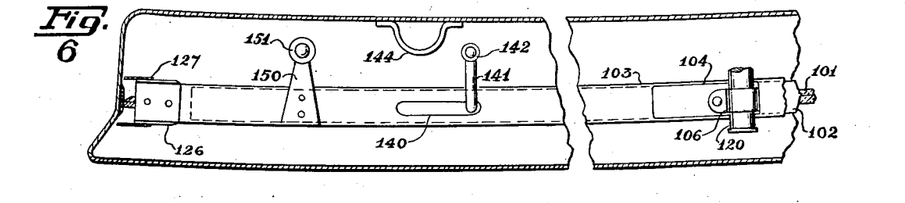
Fig. 6 is a sectional view of an inverted portion of a vehicle door showing an optional panel mounting.

Fig. 6 shows a type of panel mounting similar to that used for panel 1 but adapted to use in conjunction with a longitudinally movable panel 101. This panel preferably is carried in a metal holder or channel 102 which is slidably mounted in an outer channel 103. The bottom wall of channel 103 is provided with an opening 104 to receive the collar 106 which is engaged by pin 120 of the window lifting mechanism, corresponding to pin 20 of Figs. 1 and 9. Longitudinal movement of pin 120 will cause movement of channel 102 and glass 101 in relation to the outer channel 103. The latter carries downwardly extending end brackets 126 similar to brackets 26, Fig. 8, which engage the sides of the vertical channels 127. Preferably these channels correspond to channels 27 of Figs. 5 and 8 and have resilient upper portions to permit lateral movement of the brackets 126 which carry channel 103 and panel 101. An arm 141 projects from holder 102 through slot 140 in the bottom of channel 103 and carries a roller 142 which is adapted to engage the projection 144 upon the inner wall of the door during longitudinal movement of the channel. The panel edge may therefore follow a transversely curved path which corresponds to that defined by brackets 4 in the preferred embodiment of the invention. Channel 103 may have an outstanding arm 150 carrying a follower 151 which is in a position to be engaged by the latch mechanism to swing the panel outwardly when the latch is operated upon opening or shutting of the door, it being understood that the follower 151 is in a position corresponding to that of follower 51 in the preferred embodiment of the invention.

Figure 17:
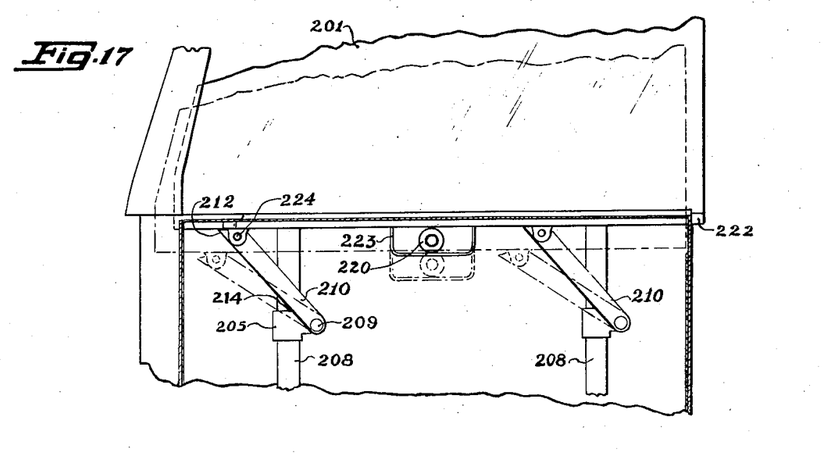
Fig. 17 is a broken view similar to Fig. 1 and illustrating another form of panel supporting and guiding means.

Fig. 17 illustrates a modified form of panel mounting and guiding means. This construction is adapted to use with any type of window lifting mechanism; in other words, it is not necessary for the window lifter to have any movement along a longitudinal path. Closure panel 201 is carried by a panel holder 222 which is lifted by the roller 220 mounted upon any conceivable window lifting means. This roller is disposed within a suitable frame 223 so that the window may be positively lowered as well as lifted. The guide members 208 may correspond in general to the members 8 shown in Fig. 1. Upon these members are mounted the sleeve members 205 corresponding in general to collars 5 of Fig. 1 but carrying the substantially horizontal pivot members 209 to which are secured the vertically swinging links 210. The opposite ends of the links are pivotally connected to panel holder 222, as indicated by numeral 224, and preferably have their upper ends provided with extensions 212 which form stops and limit the maximum angle to which the links may swing in relation to the panel. It is evident that upward movement of roller 220 results in an upward movement of panel 201 which bears against the rear wall of the door until it arrives substantially at the position designated by the dot and dash lines of Fig. 17, whereupon stops 214 are engaged by the sleeves 205 and their further vertical movement is prevented. Continued upward pressure upon panel 201 then swings links 210 about pivots 209 and moves the panel upward and backward to the full line position of Fig. 17, stops 212 limiting this movement. Links 210 and guides 208 may be resilent and may therefore permit lateral yieldability of panel 201. Furthermore, they cause the longitudinal movement of the panel to the desired extent without necessitating the use of a lifter which generates a path having a longitudinal component. With the type of mechanism illustrated in Fig. 17, means for engagement by the the latch mechanism similar to that illustrated in Figs. 4 or 6 may be used.

Figure 18:
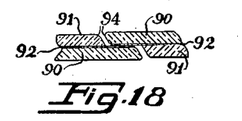
Figs. 18, 19 and 20 are sectional details illustrating various types of joints between adjoining panels.

Fig. 18 shows another form of panel joint which is particularly applicable to use with laminated glass panels. For example, one lamina 90 of each panel extends outwardly beyond the other lamina 91 thereof in order to form a rabbet. The panels 90 may be brought into overlapping relation and the cellulosic sheet 92 extended to provide cushioning means between the abutting panel portions, as shown. A panel joint of this character permits longitudinal movement of the panels in response to body weaving or bending and may be advantageously utilized in conjunction with the recommended panel supporting means. If desired the edge portions of sheets 90 and 91 may be beveled, as designated by numeral 94, in order to aid in permitting the panels to be brought into proper juxtaposition.

Figure 19:
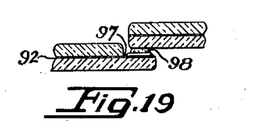

Fig. 19 shows another form of panel joint, in which one of the panels is provided with a rabbet 97 similar to that disclosed in Fig. 18. The cellulosic sheet is extended along the side of the rabbet, as designated by the numeral 92, but portions of this sheet are broken away to permit the projection of small bumpers or pads 98, base portions of which are held by or embedded in the adhesive sheet. Bumpers 98 may be formed of formaldehyde and urea compositions, comparatively pure, transparent rubber, or the like, and serve to cushion the panel edges.

Figure 20:
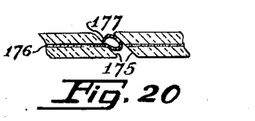

The form of panel joint shown in Fig. 20 is adapted to provide a weather-tight structure without appreciable overlapping of the panels. Each of the panels is provided with a beveled edge 175. The cellulosic layer in one of the panels, designated by numeral 176, is extended and formed into a cylindrical loop 177 which is adapted to extend along the margin of the panel and to provide a resilient bumper and water-tight seal for the same when it is engaged by the adjoining panel, the resiliency of the celluloid being depended upon for this purpose. Obviously, if desired, this loop may be reinforced with any suitable material, such as soft rubber.

I claim:

1. A vehicle body comprising a plurality of closure panels movable from a substantially concealed position within the vehicle to a juxtaposed position along the side of the vehicle, and resilient means stressed transversely of the vehicle and supporting at least one of said panels in said last-named position and holding it against an adjoining panel.

2. A vehicle body comprising a plurality of closure panels movable into a plurality of positions between a substantially concealed inoperative position and a position wherein the panels are juxtaposed to form a closure wall, resilient means supporting at least one of said panels, said means permitting and yieldably opposing lateral movement of all parts of the panel in each of said plurality of positions and holding said panel against an adjoining panel.

3. A vehicle body comprising a plurality of closure panels movable into juxtaposition to form a closure wall, resilient means supporting said panels, said means being flexed transversely of the wall out of normal shape when said panels are juxtaposed whereby the panels are firmly held in juxtaposition.

4. The subject matter of claim 3 further characterized in that the vehicle body is provided with a swinging door and one of the panels is mounted thereon, means automatically flexing the resilient means which supports that panel upon closing of the door to prevent the panel from engaging an adjoining panel at the instant of door closing.

5. In a vehicle body, a swinging door, a member abutted by the door in its closed position, a panel mounted upon the door and a part normally abutted by the panel when the door is in its closed position, means responsive to door movement and operative upon shutting of the door whereby engagement of the panel in abutting relation with said part is delayed until the door has reached its normal abutting relation to said member.

6. The subject matter of claim 5 further characterized in that the panel mounted upon the door has an unframed edge engageable with said part, and in that said part is also a closure panel.

7. In a vehicle body, a swinging door, a closure panel carried by said door and slightly movable laterally in relation thereto, a door latch mechanism operative when said door is swung to its closed position, a member normally abutted by said panel when the door is in its closed position, and means connected to the panel and operative in response to the operation of said latch mechanism to move the panel laterally, thus delaying engagement of said panel with said member upon closing of said door.

8. The subject matter of claim 7 further characterized in that the door latch mechanism comprises a remote latch control handle and means connecting said handle and latch, and in that the panel is provided with a projection engageable by said last-named means to move the panel slightly in relation to the door to effect the delayed engagement of the panel and abutting member.

9. The subject matter of claim 7 further characterized in that said panel is supported by resilient means and in that said means which is connected to said latch mechanism acts upon the resilient supporting means to move the panel in relation to the door at the instant of door closing.

10. A vehicle body comprising a swinging door, a closure panel carried by said door and movable from a position wherein it is substantially concealed in said door to a position wherein it is located substantially above said door, resilient means supporting said panel and adapted to guide it in its path between said positions, means operative in response to closing of the door to flex said resilient means when the panel is located substantially above the door, whereby the panel is moved out of normal relation to the door at the instant of door closing, said means permitting subsequent return of the panel to its normal position.

11. A vehicle body comprising a hollow body wall, a closure panel carried by said wall and movable from a position substantially within said wall to a raised position thereabove, means adjoining the base of said closure panel resiliently supporting the same and permitting lateral movement of the same in its raised position, said means also aiding in guiding the panel along its path between said positions, means is provided to move the panel longitudinally substantially in its own plane as it approaches the limit of its path at its raised position, said resilient supporting means defining this portion of the path of the panel.

12. A vehicle body comprising a hollow body wall, a closure panel carried by said wall and movable from a position substantially within said wall to a raised position thereabove, means adjoining the base of said closure panel resiliently supporting the same and permitting lateral movement of the same in its raised position, said means also aiding in guiding the panel along its path between said positions, means is provided to move the panel longitudinally substantially in its own plane near the portion of its path which terminates in its raised position, said resilient means including swinging members defining the longitudinal portion of said path.

13. A vehicle body comprising a hollow body wall, a closure panel carried by said wall and movable from a position substantially within said wall to a raised position thereabove, means adjoining the base of said closure panel resiliently supporting the same and permitting lateral movement of the same in its raised position, said means also aiding in guiding the panel along its path between said positions, means is provided to move the panel longitudinally substantially in its own plane near the portion of its path which terminates in its raised position, said resilient means including swinging members defining the longitudinal portion of said path, and further in that said swinging members pivot about substantially vertical axes whereby the panel may be brought into accurate overlapping relation with an adjoining portion of the body.

14. In a vehicle body, a hollow body wall, a closure panel carried by said wall and movable from a substantially concealed position therein to a position substantially thereabove, said panel following a path having a substantially longitudinal component in the plane of the panel during said movement, and means causing the movement of the panel edge along a path having a definite transverse component during the portion of said movement having the longitudinal component substantially within the plane of the panel, whereby the panel edge may more readily engage an adjoining member in substantially overlapping relation therewith.

15. The subject matter of claim 14 further characterized in that both vertical edges of the panel have a path of the character designated, but in that the transverse components thereof are in different directions at any given portion of the longitudinal movement.

16. In a vehicle body, a closure panel movable from inoperative to operative position, swinging members pivotally connected to the base of said panel and guiding the same, lifting mechanism adapted to move the panel vertically and in a substantially longitudinal direction in its own plane, said swinging members causing movement of the edges of said panels along curved paths during said longitudinal movement.

17. The subject matter of claim 16 further characterized in that the directions of the respective curvatures of said paths differ substantially during said panel movement.

18. The subject matter of claim 16 further characterized in that said swinging members comprise resilient supports for the panel to permit limited lateral movement of the same.

19. A vehicle body comprising a hollow body wall, a panel vertically movable from a substantially concealed position within said wall to a position thereabove, said panel having a substantially longitudinal movement in its own plane near the upper end of its vertical path, guide means defining the path of panel movement, said means comprising vertically disposed members and swinging brackets slidable thereon and pivotally connected to the base of the panel.

20. The subject matter of claim 19 further characterized in that the brackets are resilient to permit lateral movement of the panel in relation to the body wall.

21. The subject matter of claim 19 further characterized in that the vertically disposed members are resilient to permit lateral movement of said panel in relation to the body wall.

22. A vehicle body comprising a hollow body wall portion, a closure panel carried by said body portion, said closure panel being movable between a position wherein it is substantially concealed within said hollow body wall to a position thereabove, a channel engaging a vertical edge of said panel and defining its movement, the upper end of said channel being resilient and bodily swingable in relation to said body wall to permit lateral movement of said closure panel.

23. The subject matter of claim 22 further characterized in that the bight portion of the upper end of the channel is cut away and the sides of this portion are not directly connected to the body wall, whereby the channel sides are free to flex in relation to the same.

24. A vehicle body comprising a substantially vertically movable panel, a top, a valance extending along the side of the top and normally located in the path of the upper end of the panel near the limit of its vertical movement, windshield standards engaging the front portion of the top and the valance being split adjoining these standards, the valance having an integral gutter portion extending along the side of the top and outside of the windshield standards, and having its body portion inclining inwardly adjoining said standards.

25. A vehicle body comprising a top, a closure panel movable upward to a position adjoining the top, a valance of yieldable material, and resilient metal elements holding said valance upon the top, whereby said valance may be yieldably engaged by said panel.

26. The subject matter of claim 25 further characterized in that said panel is resiliently connected to said body, whereby it may be pressed yieldably inward against the valance.

27. A vehicle body comprising a swinging door, a closure panel carried by the door, an adjoining part of the vehicle engaged by the vertical edge of said panel when the door is closed, a top, a valance upon the top, said valance being adapted to be engaged by the top of said panel when said door is closed, resilient means connecting said panel to said door, said valance being so arranged that upon closing of said door it will yieldably engage the upper edge of the panel before the vertical edge is engaged by the adjoining part, whereby engagement of the vertical edge and adjoining part is cushioned.

28. A vehicle body comprising a pair of doors, one of which is located behind the other, a door post between said doors, one of said doors having a latch engaging a recess in said door post, a latch shaft for operating said latch, said post terminating below the plane of the door tops and said shaft being located above the post.

29. The subject matter of claim 28 further characterized in that the other of said doors has a hinge connection with said post, said connection including a beveled face portion designed to comprise a striker for the latch of the adjoining door.

30. A vehicle body comprising a hollow body wall portion, a transparent closure panel movable into and out of a position wherein it is substantially concealed within said body wall, and guide means defining the path of panel movement, said guide means engaging the base of said panel at points spaced from the ends thereof, whereby the marginal faces may run free of guideways, the panel being pivotally connected to lifting mechanism by means permitting pivoting of the panel substantially in its own plane in relation to said mechanism, and a flat cushioning strip extending along a transverse division of said body wall to engage a vertical edge of said panel.

31. A vehicle body comprising a plurality of beveled transparent panels, said panels having beveled margins movable into abutting engagement to form a continuous transparent closure wall, resilient means securing the panels to the remainder of the body, and holding the beveled edges against each other, whereby considerable relative movement of the panels due to body distortion will not move the beveled margins out of their abutting relation.

32. In a vehicle body, a plurality of wall sections, a pocket in each of said sections, panels movable from a lowered position within the pockets into raised juxtaposition above the body wall, the end of one of the pockets having an opening through which one of the panels may extend to engage the other panel, guide elements disposed at the ends of the pockets, resilient means connecting each of the panel ends with the guide elements, the guide element adjoining the opening at the end of the pocket being disposed at one side of that opening and at one side of the planes of the adjoining panel portions.

33. In a vehicle body, a body wall including a pair of aligned sections having pockets therein, one of said sections being a swinging door, closure panels carried by each of said sections, means for supporting the panels to hold their juxtaposed edge portions in engagement, said means being arranged to permit limited lateral movement of the edge portion of one of said panels, and means automatically actuable upon closing of the door to move said panel edge portion laterally, said last-named means being releasable upon full closing of the door, and said first means thereupon acting to return the panel edges into engagement with each other.

34. In a vehicle body, a swinging door, a panel carried by the door, an abutment movably engageable by the panel edge when the door is closed, resilient means supporting the panel upon the door and serving to urge the panel edge against the abutment, said resilient means permitting movement of the edge portion from its normal position, a member within the door movable in relation to the latter in response to swinging of the door, said member being engageable with a panel part to stress the resilient means and hold the panel out of normal position as the door is closing and being releasable as the door closes to permit the resilient means to return the panel to its normal position.

35. A vehicle body comprising a pair of aligned body sections, a closure panel carried by each of said sections, resilient means supporting one panel upon the corresponding section and urging the edge of said panel into engagement with the adjoining edge of the other panel, said resilient means including a spring having an end portion connected to the lower portion of the panel and having a path of movement laterally in relation to the body, said panel being disposed in a plane at an angle to the plane that is normal to the direction of the path of movement of the adjoining spring portion so that the upper edge of the panel is urged more firmly into engagement with the adjoining panel than its lower edge.

36. A vehicle body comprising a body wall, a top, a valance carried thereby, a body wall having a pair of sections providing pockets, closure panels moving upwardly out of said pockets to a juxtaposed position above the body wall, resilient means supporting the panels when raised and tending to hold their upper edges more firmly together than their lower edges, and yieldable elements extending along the upper edges of the pockets and being stressed to urge the lower portions of the raised panels into more firm engagement.

37. A vehicle body comprising a body wall, a top, a valance carried thereby, a body wall having a pair of sections providing pockets, closure panels moving upwardly out of said pockets to a juxtaposed position above the body wall, resilient means supporting the panels when raised and tending to hold their upper edges more firmly together than their lower edges, whereby the panels, when both are raised, have their upper edges substantially in aligned position and when one panel is raised and the other lowered its edge is displaced laterally from said position, said valance having an inclined surface engageable with the panel upper edges and arranged to engage the edge of the inwardly inclined panel and stress its resilient means to move its upper edge outwardly.

38. A vehicle body comprising a top, a valance carried thereby, a closure panel movable upwardly into engagement with the valance, said valance having a body portion with a downwardly and inwardly inclined bearing surface engageable with the upper edge of the panel, and a rib overhanging said surface to prevent intrusion of moisture between the valance and the panel, said rib having a continuous trough formed therein to provide a gutter.

39. In a vehicle body, a body wall comprising juxtaposed body sections providing pockets, a closure panel slidable from a concealed position within each pocket to a raised position thereabove, the panels when raised having juxtaposed edges in overlapping relation to provide a closure wall, guides in the pockets adjoining the juxtaposed panel edges, said guides terminating adjoining the lower parts of the panels in their raised positions, and resilient parts between the body wall and margins of said panels which are remote from their juxtaposed upper corners, said resilient parts being stressed transversely of the body wall to hold the juxtaposed edges of the raised panels in engagement.

40. In a vehicle body, a body wall comprising juxtaposed body sections providing pockets, a closure panel slidable from a concealed position within each pocket to a raised position thereabove, the panels when raised having juxtaposed edges in overlapping relation to provide a closure wall, guides in the pockets adjoining the juxtaposed panel edges, said guides terminating adjoining the lower parts of the panels in their raised positions, and a resilient part connected to the lower portion of one panel and slidably associated with the corresponding guide, said part being stressed transversely of the body wall to hold juxtaposed edges of the raised panels in engagement.

41. In a vehicle body, a body wall comprising juxtaposed body sections providing pockets, a closure panel slidable from a concealed position within each pocket to a raised position thereabove, the panels when raised having juxtaposed edges in overlapping relation to provide a closure wall, guides in the pockets adjoining the juxtaposed panel edges, said guides terminating adjoining the lower parts of the panels in their raised positions, one of said guides being resilient, a part connected to the lower portion of the panel and slidably associated with the corresponding guide, the latter being stressed transversely of the body wall to hold the juxtaposed panel edges in engagement.

42. A vehicle body comprising a top, a valance carried thereby, a closure panel movable upwardly into engagement with the valance, said valance having a body portion with a downwardly and inwardly inclined bearing surface engageable with the upper edge of the panel, said surface being yieldably engageable with the panel upper edge, and a rib overhanging said surface to prevent the intrusion of moisture between the valance and panel.

43. In a vehicle body, a body wall providing a pocket, a panel movable upwardly out of said pocket to a raised position thereabove, said panel being movable in a generally vertical path until it approaches its upmost position and then being movable longitudinally, a lifter to effect the movement of the panel, and guide means for the panel, comprising swinging elements pivotally connected to the panel, and vertically slidable means within the pocket pivotally connected to the swinging elements.

44. In a vehicle body, a body wall providing a pocket, a panel movable upwardly out of said pocket to a raised position thereabove, said panel being movable in a generally vertical path until it approaches its upmost position and then being movable longitudinally, a lifter to effect the movement of the panel, and guide means for the panel, comprising swinging elements pivotally connected to the panel, and vertically slidable means within the pocket pivotally connected to the swinging elements, the pivotal connections between said elements and the panel and the slidable means providing substantially horizontal axes.

45. In a vehicle body, a body wall including at least three sections, each of said sections providing pockets, two of said sections being doors, panels movable upwardly out of said pockets to a raised position thereabove wherein the panels provide a closure wall, means defining the path of the intermediate panel and causing it to move in a substantially straight vertical path between its raised and lowered positions, means defining the path of movement of the adjoining panels, each of said panels moving from its lowered position in a path substantially parallel to that of the intermediate panel and spaced therefrom, but when nearly at its raised position being movable longitudinally into contact with said intermediate panel.

46. In a vehicle body, a body wall including adjoining sections, each of said sections providing pockets, panels movable upwardly out of said pockets to a raised position thereabove wherein the panels are juxtaposed, the adjoining edges of the panels being beveled and in overlapping engagement when the panels are fully raised and parts yieldably supporting the panel edges, said parts being stressed transversely of the body wall and holding the beveled edges in engagement despite body weaving and twisting.

47. In a vehicle body, a body wall, panels disposed above the body wall and overlapping each other to form a closure wall, the panels having their juxtaposed edges shaped to contact each other substantially throughout the height of the panels, despite variation in angular positioning of the panel edges either longitudinally or transversely of the body wall, and means yieldably pressing the panels toward each other in directions transversely of the body wall and thus holding their edges in engagement.

48. In a vehicle body, a body wall, panels disposed above the body wall and overlapping each other to form a closure wall, the panels having their juxtaposed edges shaped to contact each other substantially throughout the height of the panels, despite variation in angular positioning of the panel edges either longitudinally or transversely of the body wall, and resilient elements connected to the bases of the panels and yieldably pressing the panels toward each other in directions transversely of the body wall and thus holding their edges in engagement.

49. In a vehicle body, a body wall, panels disposed above the body wall and overlapping each other to form a closure wall, the panels having their juxtaposed edges provided with somewhat yieldable cushioning material and shaped to contact each other substantially throughout the height of the panels, despite variation in angular positioning of the panel edges either longitudinally or transversely of the body wall, and means yieldably pressing the panels toward each other in directions transversely of the body wall and thus holding their edges in engagement.

50. In a vehicle body, a body wall, panels having juxtaposed transparent edges and being disposed above the body wall and overlapping each other to form a closure wall, the panels having their juxtaposed edges shaped to contact each other substantially throughout the height of the panels, despite variation in angular positioning of the panel edges either longitudinally or transversely of the body wall, and means yieldably pressing the panels toward each other in directions transversely of the body wall and thus holding their edges in engagement.

51. A vehicle body comprising a body wall, said wall including a pair of sections, each section providing a pocket, a panel movable upwardly out of each pocket to a raised position thereabove, one of said panels having a final movement at the upper end of its path in a generally horizontal direction, a resilient part between said panel and the vehicle wall, a projecting element carried by the base of said panel, a fixed part carried by the body wall, said element engaging said fixed part to flex said resilient part transversely of the panel during the final movement of the panel, the resilient part then moving the panel transversely into overlapping engagement with the adjoining panel as the element passes said fixed part.

52. In a vehicle body, a swinging door section, an adjoining body section, a pocket in each of said sections, a closure panel movable upwardly out of each pocket into juxtaposition to the adjoining panel, means supporting said panels and holding their juxtaposed edges in firm engagement when raised, said means including a resilient element supporting the lower portion of one of said panels, said resilient element tending to cause the inclination of the panel edge when the door is open from the normal position occupied in engagement with the adjoining panel, and means automatically operable in response to movement of the door to stress the resilient element and restrain the panel edge from having such an inclination as the door approaches its closed position, said means releasing the panel and element from the restraining action as the door closes, whereby upon door closing the panel edges may be brought into proper juxtaposition to each other.

53. A vehicle body including a top and body wall below the top, said body wall including a swinging door and an adjoining section, uprights connected to the front end of the top, extensions of the top being substantially aligned with the rear of the body wall and extending downwardly to the same, and a plurality of closure panels supported by the body wall and extending between the same and the top, one of said panels being carried by the door, one of said panels being carried by said adjoining section, supporting means for said panels holding their edges in engagement, said panels having body portions formed of substantially rigid and self-maintaining transparent material and having juxtaposed transparent edges in engagement with each other, one of said panels having an edge cushioning strip of yieldable transparent material secured to the rigid material of its body portion and engaging the edge of the adjoining panel, the closure panels thus cooperating to form a continuous transparent closure wall extending from the region of an upright to the region of a corresponding top extension.

54. In a vehicle body, a body wall comprising juxtaposed body sections providing pockets, a closure panel slidable from a concealed position in each of said pockets to a raised position thereabove, supporting and guiding means for said panels, said means holding the edges of the raised panels in overlapping juxtaposition, said means including a guide in one of the pockets adjoining the juxtaposed edges of the panels, said guide terminating adjoining the lower part of the raised panels, said means also including a resilient part connected to the lower part of one of the panels and slidably associated with said guide, said part being stressed to hold the edges of the raised panels in engagement, said part, when relieved from stress by lowering of the adjoining panel, tending to tip the upper edge of the panel to which it is connected into the position previously occupied by the upper part of the lowered adjoining panel while moving the lower part of this edge a substantially smaller distance in the same direction.

55. A vehicle body comprising a body wall including a door section and an adjoining section, pockets in each of said sections, a panel movable out of the pocket in the door section, a second panel movable out of the other pocket, supporting and guiding means for said panels, said means causing one of said panels to follow a substantially straight vertical path between its raised and lowered positions, and throughout this path to have its edge in overlapping engagement with that of the adjoining panel when the latter is raised, the body wall providing an opening between said pockets to permit this engagement, said means includng a transversely stressed yieldable part pressing one of the panel edges transversely against the adjoining edge of the other panel.

56. A vehicle body comprising a body wall including a door section and an adjoining section, each of said sections providing pockets, panels movable from a lowered position in said pockets to a raised position thereabove, wherein the panels are in overlapping engagement to provide a continuous closure wall, supporting and guiding means for said panels, said means including a supporting element permitting limited lateral movement of the panel with which it is associated, a compressible part disposed adjoining the top of the body wall, said part contacting the surface of one of said panels throughout its path and being stressed to urge that panel into overlapping engagement with the edge of the adjoining panel.

57. A vehicle body comprising a body wall including a swinging door section and an adjoining section, a panel carried by the door section and having a width substantially as great as that of the door section, a panel carried by the adjoinnig section, positioning and guiding means for said panels for holding them in raised postion wherein they are in overlapping contact, in concealed position within the respective sections, and in a plurality of partially raised positions therebetween, said means including a resilient part associated with one of said panels and being effective to press the edge of that panel transversely against the edge of the adjoining panel while permitting and yieldably opposing transverse movement of all parts of the panel edge transversely of the body wall, whereby the panel edges are held in engagement despite weaving and twisting of the body wall.

58. A vehicle body comprising a body wall including a swinging door section and an adjoining section, a panel carried by the door section and having a width substantially as great as that of the door section, a panel carried by the adjoining section, positioning and guiding means for said panels for holding them in raised position wherein they are in overlapping contact, in concealed position within the respective sections, and in a plurality of partially raised positions therebetween, said means including resilient parts associated with the panels and being effective to press the edges of said panels transversely against each other, while permitting and yieldably opposing transverse movement of all parts of the juxtaposed panel edges transversely of the body wall, whereby the panels may remain in contact despite body weaving and twisting and whereby any part of their contacting edge portions will yieldingly oppose and move in response to a transverse force.

59. A vehicle body comprising a body wall including a plurality of sections, panel units mounted one on each of the sections, guiding and positioning means for the panel units effective to permit independent movement of each panel from a concealed position in the corresponding section to a raised position thereabove, said means including a pair of vertically spaced resilient parts mounted on the body wall engaging one of said panel units and effective to press its edge transversely against the edge of an adjoining unit.

60. A vehicle body comprising a body wall including a swinging door section and an adjoining section, panels carried one on each of said sections, guiding and positioning means for the panels effective to permit independent movement of each panel out of the correspondng section into a raised position thereabove wherein the panels are directly juxtaposed, said means including a holder slidably engaging the lower edge of one of the panels and connected to the body wall, said panel being slidable longitudinally of the body wall in said holder and thus being movable into and out of engagement with the adjoining panel.

61. A vehicle body comprising a body wall, a panel mounted on the body wall, a holder slidably engaging the lower edge of the panel and connected to the body wall, said panel being slidable longitudinally in said holder, a second panel mounted on the body wall, the first panel being slidable in its holder into and out of engagement in the said second panel, and means to move the holder and first panel transversely during sliding movement therebetween, whereby the panel edges are readily moved into and out of overlapping engagement.

Signed by me at Boston, Massachusetts, this 11th day of April, 1927.

R. L. CARR.